United States Patent
Takeuchi et al.

(10) Patent No.: US 7,042,608 B2
(45) Date of Patent: May 9, 2006

(54) SCANNING OPTICAL SYSTEM

(75) Inventors: Shuichi Takeuchi, Saitama-ken (JP); Daisuke Koreeda, Saitama-ken (JP)

(73) Assignee: PENTAX Corporation, Tokyo (JP)

(*) Notice: Subject to any disclaimer, the term of this patent is extended or adjusted under 35 U.S.C. 154(b) by 160 days.

(21) Appl. No.: 10/663,643

(22) Filed: Sep. 17, 2003

(65) Prior Publication Data

US 2004/0218242 A1    Nov. 4, 2004

(30) Foreign Application Priority Data

Sep. 18, 2002 (JP) .............................. 2002-271883
Nov. 28, 2002 (JP) .............................. 2002-346400

(51) Int. Cl.
G02B 26/08    (2006.01)

(52) U.S. Cl. ..................................................... 359/212

(58) Field of Classification Search ................ 359/212, 359/216, 209
See application file for complete search history.

(56) References Cited

U.S. PATENT DOCUMENTS 5,477,554 A    12/1995 Yoshii et al.
5,748,352 A    5/1998 Hattori
5,838,502 A    11/1998 Park et al.
5,859,720 A    1/1999 Ishibe
5,903,536 A    5/1999 Lee et al.
5,986,993 A    11/1999 Yoo et al.

FOREIGN PATENT DOCUMENTS

JP    9-80333    3/1997

*Primary Examiner*—Euncha P. Cherry
(74) *Attorney, Agent, or Firm*—Greenblum & Bernstein P.L.C.

(57) ABSTRACT

In a scanning optical system, a partial light blocking member having an annular light blocking part (for blocking off part of the incident laser beam entering the annular area around the central axis of the laser beam) is placed on an optical path between the laser light source and the polygon mirror. The scanning optical system including such a partial light blocking member is installed in a printer. By the effect of the partial light blocking member, the intensity of side lobes (several rings of light accompanying the main beam) is prevented from exceeding a threshold value even when optical surfaces of an imaging optical system of the scanning optical system have certain microscopic undulations, by which black stripes occurring in halftone printing can be eliminated.

23 Claims, 13 Drawing Sheets

SCANNING OPTICAL SYSTEM

BACKGROUND OF THE INVENTION

The present invention relates to a scanning optical system for forming an electrostatic latent image on a scan target surface such as a surface of a photosensitive drum, and a printer including such a scanning optical system.

As is well known, scanning optical systems are installed in a variety of printing devices such as laser beam printers, fax machines and copy machines. The scanning optical system dynamically deflects a laser beam (which has been modulated according to image information) by use of a deflecting system such as a rotating polygon mirror and converges the dynamically deflected laser beam on the surface of a photosensitive drum by use of an imaging optical system, by which the surface of the photosensitive drum (scan target surface) is scanned with the converged laser beam and thereby an electrostatic latent image composed of a plurality of dots is drawn on the scanned surface of the photosensitive drum.

In general, intensity distribution of the laser beam incident on the scan target surface is not a perfect Gaussian distribution, and it is known that the main beam is accompanied by several rings of light (side lobes) of lower light quantity which are caused by diffraction at apertures placed on the optical path of the laser beam. The side lobe is known to expose the photosensitive drum and cause print error called "black stripes" in halftone printing if the intensity of the side lobe exceeds approximately 6% of the central intensity of the main beam (reference: Japanese Patent Provisional Publication No.HEI09-080333). In an ideal state of the imaging optical system, the side lobe intensity remains at approximately 4% of the central intensity of the main beam, by which the black stripes are not caused.

However, if microscopic undulations exist on an optical surface of the imaging optical system, the side lobe intensity changes as the laser beam passes through the undulating part. In this case, if the side lobe intensity exceeds the threshold value, the black stripes occur in halftone printing.

SUMMARY OF THE INVENTION

The present invention is advantageous in that it provides a scanning optical system and a printer including a scanning optical system capable of reducing the possibility of high side lobe intensity exceeding the threshold value even when optical surfaces of the imaging optical system have certain microscopic undulations.

In accordance with an aspect of the present invention, there is provided a scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on the scan target surface. The scanning optical system includes an optical element being placed on an optical path between the light source and the deflecting system. The optical element includes: a central area transmitting part of the laser beam in the vicinity of a central axis of the laser beam; at least one light blocking area blocking part of the laser beam incident on part of the optical element outside the central area; and at least one light transmitting area transmitting part of the laser beam incident on part of the optical element other than the central area and the light blocking area.

In accordance with another aspect of the present invention, there is provided a printer including a scanning optical system having the above configuration.

By the scanning optical system and the printer configured as above, the intensity of the side lobes of the laser beam incident on the scan target surface can be reduced sufficiently. Further, the intensity of the side lobes of the laser beam incident on the scan target surface can be reduced to less than 2% of the central intensity of the main beam if the sizes of the central area, the light blocking area and the light transmitting area are set properly. Therefore, even if the side lobe intensity increased by several % due to microscopic undulations of optical surfaces of the imaging optical system, the side lobe intensity hardly exceeds the threshold value required for the exposure of the scan target surface, by which the black stripes occurring in halftone printing can be prevented and print quality can be improved.

Optionally, the central area and the at least one light transmitting area may give the same phase to beams passing therethrough.

In a particular case, the optical element may include a pair of the light blocking/transmitting areas.

Optionally, the at least one light blocking area may be placed outside the central area to adjoin thereto, and the at least one light transmitting area may be placed outside the at least one light blocking area to adjoin thereto.

Still optionally, each of the at least one light blocking area and the at least one light transmitting area may be placed to be on both sides of the central area in regard to the main scanning direction.

Still optionally, each of the at least one light blocking area and the at least one light transmitting area may be placed symmetrically with respect to the central area in regard to the main scanning direction.

In a particular case, a cross section of the laser beam incident on the optical element taken along a plane perpendicular to the central axis may have an elliptical form.

Optionally, the elliptical cross section of the laser beam may have its major axis in the main scanning direction.

In a particular case, a distance "ha1" between the central axis of the laser beam incident on the optical element and an inner edge of the light blocking area measured in the main scanning direction, a distance "ha2" between the central axis of the laser beam and an outer edge of the light blocking area measured in the main scanning direction, and a radius "hmax" of a cross section of the laser beam incident on the optical element measured in the main scanning direction may satisfy a condition:

$$0.70 < ((ha1+ha2)/2)/hmax < 0.85 \quad (1).$$

In the condition (1), if the value $((ha1+ha2)/2)/hmax$ gets higher than the upper limit, the effect of reducing the side lobe intensity in the vicinity of the main beam becomes insufficient. On the other hand, setting the value $((ha1+ha2)/2)/hmax$ below the lower limit causes the increase of side lobe intensity at side lobes away from the main beam.

In a particular case, the optical element may include two or more pairs of the light blocking/transmitting areas.

Optionally, the light blocking areas and the light transmitting areas may be arranged alternately outward from the central area.

In a particular case, the light blocking areas and the light transmitting areas may be arranged alternately in regard to the main scanning direction.

Optionally, each of the light blocking areas is placed symmetrically with respect to the central area in regard to the main scanning direction.

Alternatively or additionally, each of the light transmitting areas may be placed symmetrically with respect to the central area in regard to the main scanning direction.

In a particular case, a cross section of the laser beam incident on the optical element taken along a plane perpendicular to the central axis may have an elliptical form.

Optionally, the elliptical cross section of the laser beam may have its major axis in the main scanning direction.

In a particular case, a distance "hb1" between the central axis of the laser beam incident on the optical element and an inner edge of an outermost one of the light blocking areas measured in the main scanning direction, a distance "hb2" between the central axis of the laser beam and an outer edge of the outermost light blocking area measured in the main scanning direction, and a radius "hmax" of a cross section of the laser beam incident on the optical element measured in the main scanning direction may satisfy a condition:

$$0.85 < ((hb1+hb2)/2)/hmax < 0.95 \quad (2).$$

In the condition (2), if the value $((hb1+hb2)/2)/hmax$ gets higher than the upper limit, the effect of reducing the side lobe intensity in the vicinity of the main beam becomes insufficient. On the other hand, setting the value $((hb1+hb2)/2)/hmax$ below the lower limit causes the increase of side lobe intensity at side lobes away from the main beam.

Optionally, a distance "hc1" between the central axis of the laser beam incident on the optical element and an inner edge of an innermost one of the light blocking areas measured in the main scanning direction, a distance "hc2" between the central axis of the laser beam and an outer edge of the innermost light blocking area measured in the main scanning direction, and the radius "hmax" of the cross section of the laser beam measured in the main scanning direction may satisfy a condition:

$$0.65 < ((hc1+hc2)/2)/hmax < 0.75 \quad (3).$$

In the condition (3), if the value $((hc1+hc2)/2)/hmax$ gets higher than the upper limit, the effect of reducing the side lobe intensity in the vicinity of the main beam becomes insufficient. On the other hand, setting the value $((hc1+hc2)/2)/hmax$ below the lower limit causes the increase of side lobe intensity at side lobes away from the main beam.

Still optionally, the scanning optical system satisfies a condition:

$$0.20 < Sa/(Sa+Sb) < 0.75 \quad (4)$$

where Sa represents a size of a portion of the innermost one of the light blocking areas, the laser beam being incident on the innermost one of the light blocking areas within the portion of the innermost one, and Sb represents a size of a portion of the outermost one of the light blocking areas, the laser beam being incident on the outermost one of the light blocking areas within the portion of the outermost one.

Optionally, the scanning optical system may satisfy a condition:

$$0.03 < S'/S < 0.30 \quad (5)$$

where S' represents a size of a portion of the at least one light blocking area, the laser beam being incident on the at least one light blocking area within the portion of the at least one light blocking area, and S represents a size of a cross section of the laser beam incident on the optical element taken along a plane perpendicular to the central axis.

In a particular case, the imaging optical system may be implemented by an optical system including a reflecting surface.

In a particular case, the optical element may further include a shading part as an aperture stop. In this case, the at least one light blocking area and the at least one light transmitting area are placed in an aperture of the shading part.

BRIEF DESCRIPTION OF THE ACCOMPANYING DRAWINGS

The objects and features of the present invention will become more apparent from the consideration of the following detailed description taken in conjunction with the accompanying drawings, in which.

DETAILED DESCRIPTION OF THE EMBODIMENTS

Figure 1:
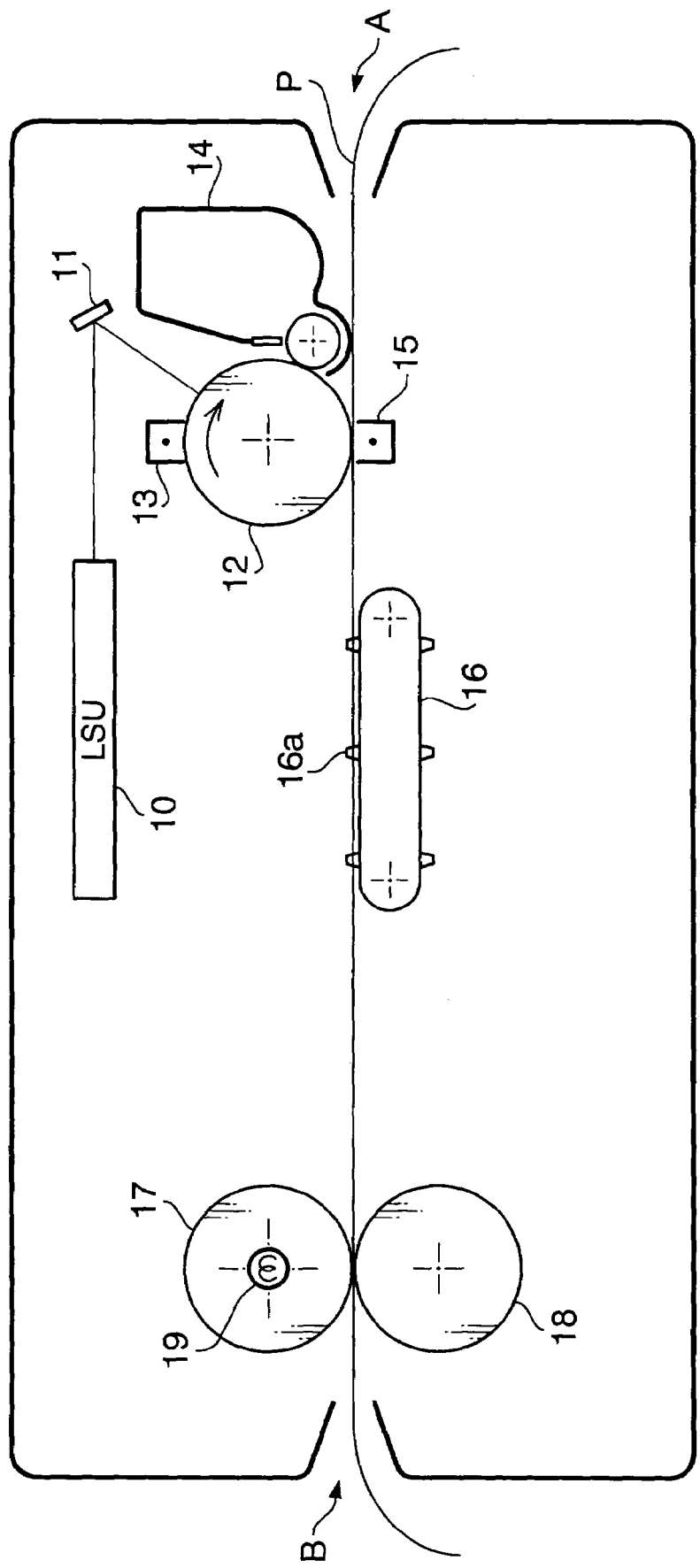
FIG. 1 is a schematic block diagram briefly showing the configuration of a laser beam printer in accordance with a first embodiment of the present invention.

Referring now to the drawings, a description will be given in detail of preferred embodiments in accordance with the present invention. In each of the following embodiments, a scanning optical system according to the present invention will be applied to a laser beam printer as an example of a device employing the scanning optical system.

First Embodiment

<Outline of Configuration of Laser Beam Printer>

First, the outline of the configuration of the laser beam printer will be explained referring to FIG. 1. FIG. 1 is a schematic block diagram briefly showing the configuration of the laser beam printer of the first embodiment. The laser beam printer is connected to a device such as a personal computer, receives print data (including image data) from the device, and prints an image according to the image data on continuous paper (fanfold paper P, for example).

Around a photosensitive drum 12 shown in FIG. 1, a charging module 13, a reflecting mirror 11, a development module 14, and a transfer module 15 are placed in the clockwise order. When the photosensitive drum 12 rotates in the clockwise direction in FIG. 1, the charging module 13 electrostatically charges the surface of the photosensitive drum 12 first. Subsequently, a scanned beam (modulated beam) outputted by an LSU (Laser Scanning Unit) 10 according to the print data is reflected by the reflecting mirror 11 to the photosensitive drum 12 and thereby an electrostatic latent image is formed on the surface of the photosensitive drum 12.

Subsequently, the development module 14 applies toner on the electrostatic latent image and thereby develops the latent image into a toner image. Finally, the transfer module 15 transfers the toner image to the fanfold paper P.

The fanfold paper P is continuous paper which is guided from an inlet opening A to an outlet opening B of the laser beam printer. On both edges of the fanfold paper P, unshown feeding holes are formed at preset intervals. A tractor 16 is a belt conveyer having projections 16a to be engaged with the feeding holes, by which the fanfold paper P is fed at a traveling speed equal to the peripheral speed of the rotating photosensitive drum 12.

On the downstream side of the tractor 16, a heat roller 17 and a press roller 18 are provided in order to hold and press the fanfold paper P from both sides. The heat roller 17, including a halogen lamp 19 as a heater, is driven and rotated by an unshown motor at a peripheral speed equal to the traveling speed of the fanfold paper P. The press roller 18, pressing the heat roller 17 with constant pressure, is rotated according to the rotation of the heat roller 17. Thus, when part of the fanfold paper P to which the toner image has been transferred from the photosensitive drum 12 passes through the heat roller 17 and press roller 18, the toner on the paper is squashed by the heat and pressure applied by the rollers 17 and 18, by which the toner image is fixed on the fanfold paper P.

<Optical Configuration of LSU>

Figure 2:
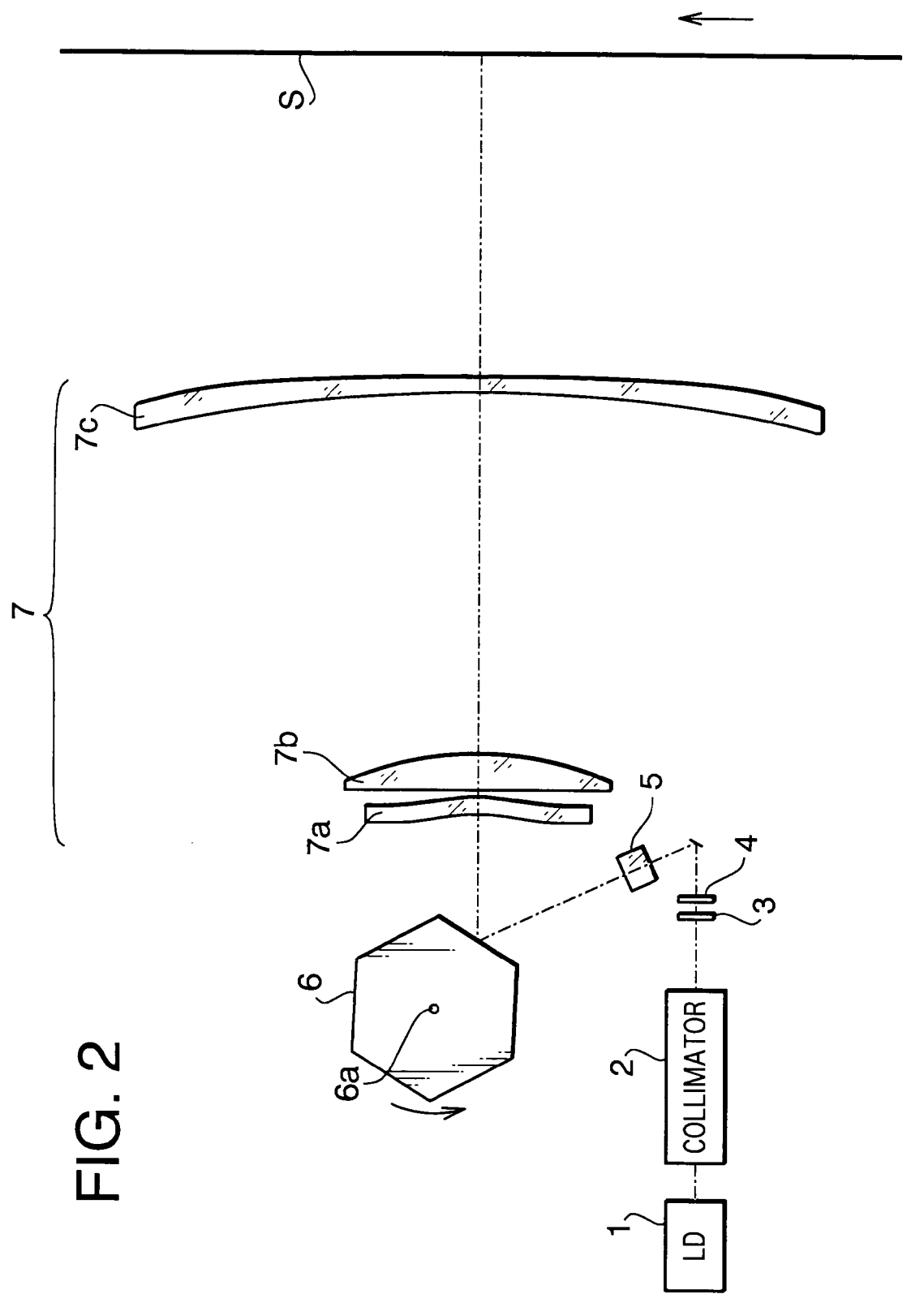
FIG. 2 is a schematic optical block diagram of a scanning optical system in accordance with the first embodiment of the present invention.

Next, the scanning optical system installed in the LSU 10 will be explained in detail. FIG. 2 is a schematic optical block diagram of the scanning optical system. As shown in FIG. 2, the scanning optical system includes a laser light source 1, a collimator lens (collimator) 2, a partial light blocking member 3, an aperture stop 4, a cylindrical lens 5, a polygon mirror 6, and an fθ lens 7 including lenses 7a–7c.

The laser beam emitted from the laser light source 1 as a diverging beam is collimated by the collimator lens 2 into a parallel beam having an elliptical sectional form, passes through the partial light blocking member 3, the aperture stop 4 and the cylindrical lens 5, and is dynamically deflected by reflecting surfaces of the polygon mirror 6 rotating at a constant angular velocity.

The laser beam deflected by the polygon mirror 6 passes through the first through third lenses 7a–7c of the fθ lens 7 as the imaging optical system (focal length: 135.5 mm), by which the laser beam is converged into a spot beam exposing the scan target surface S. According to the dynamic deflection by the rotating polygon mirror 6, the surface of the photosensitive drum 12 (scan target surface S) is scanned with the spot beam in a main scanning direction at a constant speed.

The scanning spot beam draws a linear trail (scan line) on the scan target surface S. Thus, by the movement of the scan target surface S in an auxiliary scanning direction (perpendicular to the main scanning direction) at a constant speed, a plurality of scan lines are formed on the scan target surface S at even intervals. Since the laser beam repetitively scanned on the scan target surface S has been on-off modulated by an unshown modulator (or by the laser light source 1) according to the image information, a two-dimensional image composed of a plurality of dots is drawn on the scan target surface S.

Incidentally, with regard to the main scanning direction, the laser beam which passed through the cylindrical lens 5 is reflected by the polygon mirror 6 maintaining its parallelism and is converged on the scan target surface S by the refractive power of the fθ lens 7. Meanwhile, with regard to the auxiliary scanning direction, the laser beam is once focused on a point in the vicinity of a reflecting surface of the polygon mirror 6 by the refractive power of the cylindrical lens 5, enters the fθ lens 7 as a diverging beam, and is focused again on the scan target surface S by the refractive power of the fθ lens 7.

Since the point in the vicinity of the reflecting surface of the polygon mirror 6 and the scan target surface S are set optically conjugate with each other by the fθ lens 7 with regard to the auxiliary scanning direction, deviation of scanning position on the scan target surface S in the auxiliary scanning direction caused by slight tilting (the so called "facet error") of each reflecting surface of the polygon mirror 6 is corrected and eliminated.

<Partial Light Blocking Member>

Next, the partial light blocking member 3 will be explained in detail. The partial light blocking member 3 is a rectangular plate-like optical element which transmits most of the laser beam emerged from the collimator lens 2.

Figure 3A:
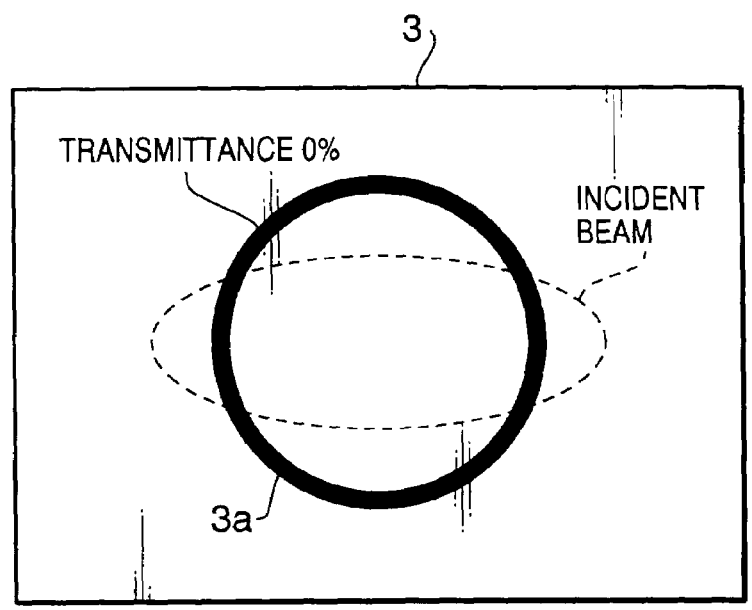
FIGS. 3A and 3B are a front view and a side view of a partial light blocking member employed in the scanning optical system of FIG. 2.
Figure 3B:
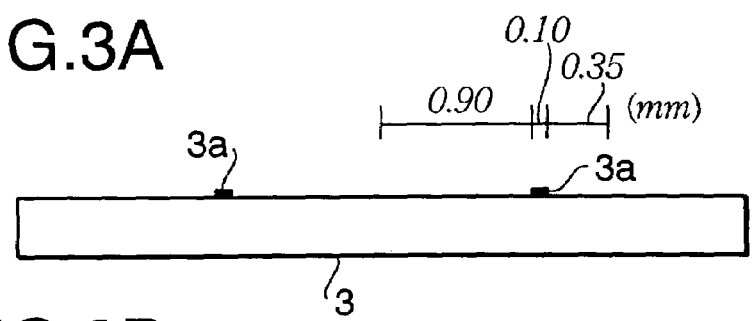

FIGS. 3A and 3B are a front view and a side view of the partial light blocking member 3, respectively. As shown in FIG. 3A, the partial light blocking member 3 is formed of a transparent plate and an annular light blocking film (transmittance: 0) attached to the transparent plate as a light blocking part 3a (light blocking area). The light blocking part 3a is provided around the center of the transparent plate. The partial light blocking member 3 is placed perpendicularly to the central axis of the laser beam and its position is adjusted so that part of the laser beam in the vicinity of the beam central axis will be incident on an area inside the light blocking part 3a.

As mentioned before, the sectional form of the laser beam to be incident on the partial light blocking member 3 is shaped by the collimator lens 2 into an ellipse (see a broken line in FIG. 3A), and the ellipse has the major axis in the main scanning direction and the minor axis in the auxiliary scanning direction. In the first embodiment, the major radius (radius on the major axis) of the sectional form of the laser beam incident on the partial light blocking member 3 is set to 1.35 mm (=hmax), and the minor radius (radius on the minor axis) is set to 0.50 mm.

As shown in FIG. 3B, since the internal diameter and external diameter of the light blocking part 3a are 1.80 mm (=2×(ha1)) and 2.00 mm (=2×(ha2)), the width of the light blocking part 3a in the radial direction is only 0.10 mm. Thus, a small portion of the laser beam incident on the partial light blocking member 3 is blocked off by the light blocking part 3a while most of the incident laser beam passes through the partial light blocking member 3.

Incidentally, both abeam incident on the area inside the light blocking part 3a (central area) and a beam incident on the area outside the light blocking part 3a (light transmitting area) pass through transparent areas of the same optical thickness, therefore, the beams will have the same phase after passing through the partial light blocking member 3. The value ((ha1+ha2)/2)/hmax equals 0.704, therefore, the partial light blocking member 3 of the first embodiment satisfies the aforementioned condition (1).

$$0.70 < ((ha1+ha2)/2)/hmax < 0.85 \tag{1}$$

<Aperture Stop>

Figure 4:
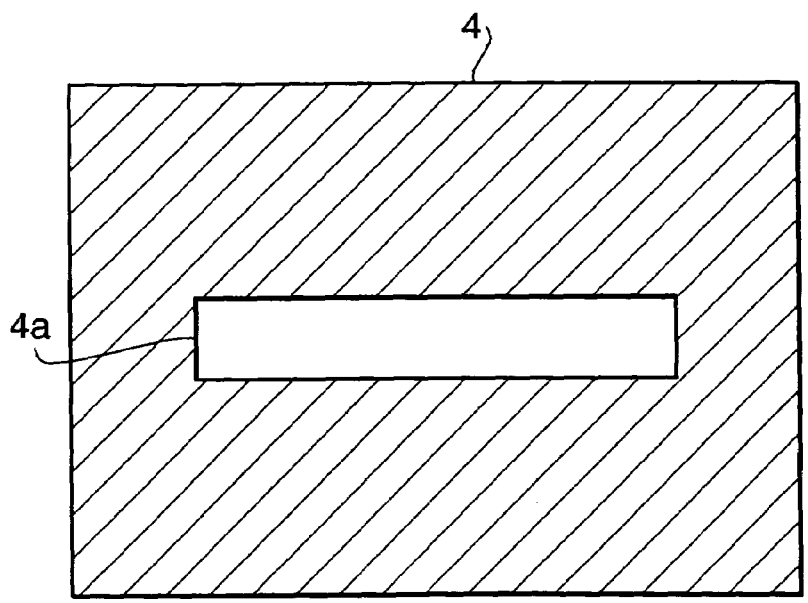
FIG. 4 is a front view of an aperture stop employed in the scanning optical system of FIG. 2.

Next, the aperture stop 4 will be explained. As shown in FIG. 4, the aperture stop 4 is a flat plate in which a slit 4a extending in the main scanning direction is formed as the aperture.

<Function of First Embodiment>

In the following, the intensity distribution of the laser beam on the scan target surface S scanned by the scanning optical system of the first embodiment configured as above will be described comparing two cases with and without the partial light blocking member 3.

Figure 5:
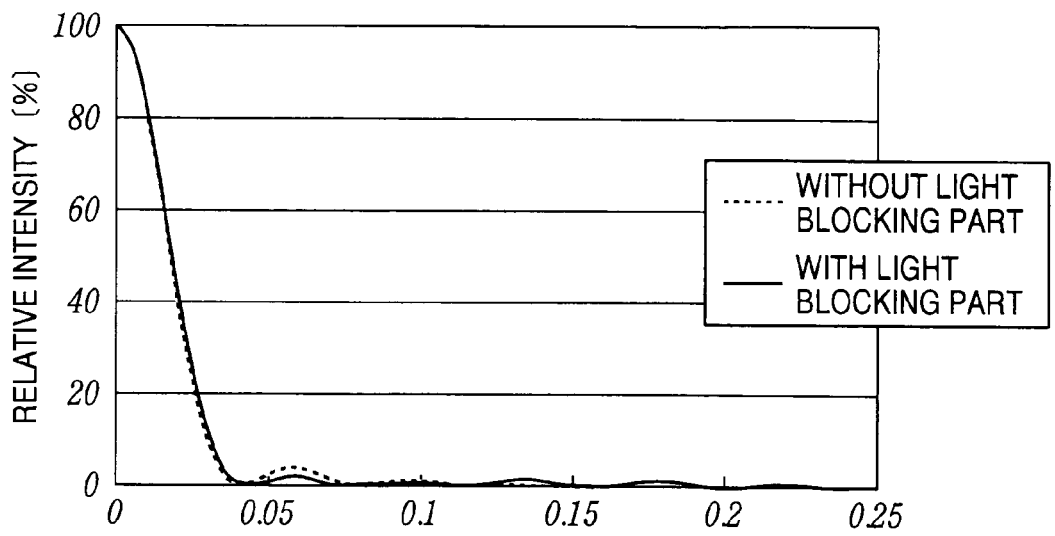
FIG. 5 is a graph showing the intensity distribution of the laser beam incident on a scan target surface with and without the partial light blocking member of FIGS. 3A and 3B.
Figure 6:
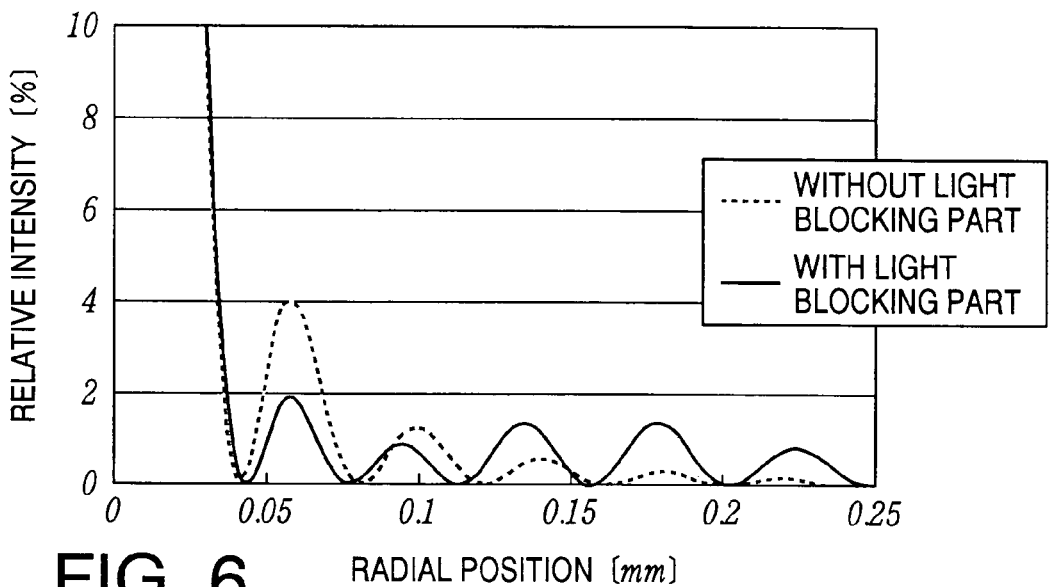
FIG. 6 is a graph magnifying part of FIG. 5.

FIG. 5 is a graph showing the intensity distribution of the laser beam incident on the scan target surface S measured in a range from the beam central axis to a point 0.25 mm away from the central axis in the main scanning direction, in which the intensity is indicated as a ratio relative to the central intensity of the beam (relative intensity). FIG. 6 is a graph magnifying a relative intensity range 0%–10% of the graph of FIG. 5. In FIGS. 5 and 6, broken lines indicate the intensity distribution without the partial light blocking member 3, and solid lines indicate the intensity distribution with the partial light blocking member 3.

In the case where no partial light blocking member 3 is used (broken lines in FIGS. 5 and 6), the intensity of the side lobes gets lower as the distance between the side lobe and the main beam gets longer. The intensity of the side lobe adjacent to the main beam is a little over 4%.

In contrast, in the case where the partial light blocking member 3 is used (solid lines in FIGS. 5 and 6), the change in the side lobe intensity depending on the distance from the main beam is considerably small, with no side lobe exceeding 2%.

Therefore, even if the side lobe intensity increased by several % due to certain microscopic undulations of lens surfaces of the lenses 7a–7c of the fθ lens 7, the side lobe intensity hardly exceeds the threshold value required for the exposure of the photosensitive drum 12.

Incidentally, it is desirable that the size S' which is a size of the light blocking part 3a inside the broken line in FIG. 3A seen from the front of the partial light blocking member 3 should be set properly relative to the size S of the cross section of the laser beam. In the first embodiment, since S' is 0.16 and S is 2.12, the ratio S'/S is 0.08, therefore, the partial light blocking member 3 satisfies the aforementioned condition (5).

$$0.03 < S'/S < 0.30 \tag{5}$$

Figure 7:
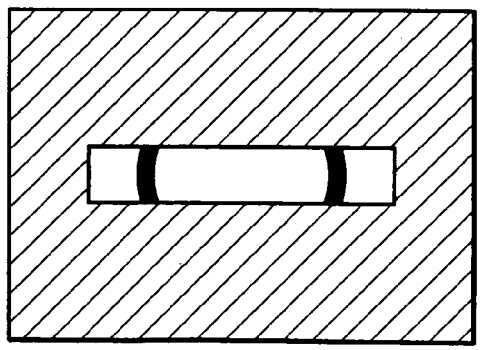
FIG. 7 is a schematic diagram showing an example in which the partial light blocking member and the aperture stop are formed integrally.

While the partial light blocking member 3 and the aperture stop 4 were described as separate components in the above explanation, they can also be formed integrally. For example, the partial light blocking member 3 and the aperture stop 4 may be bonded together as shown in FIG. 7.

Figure 8:
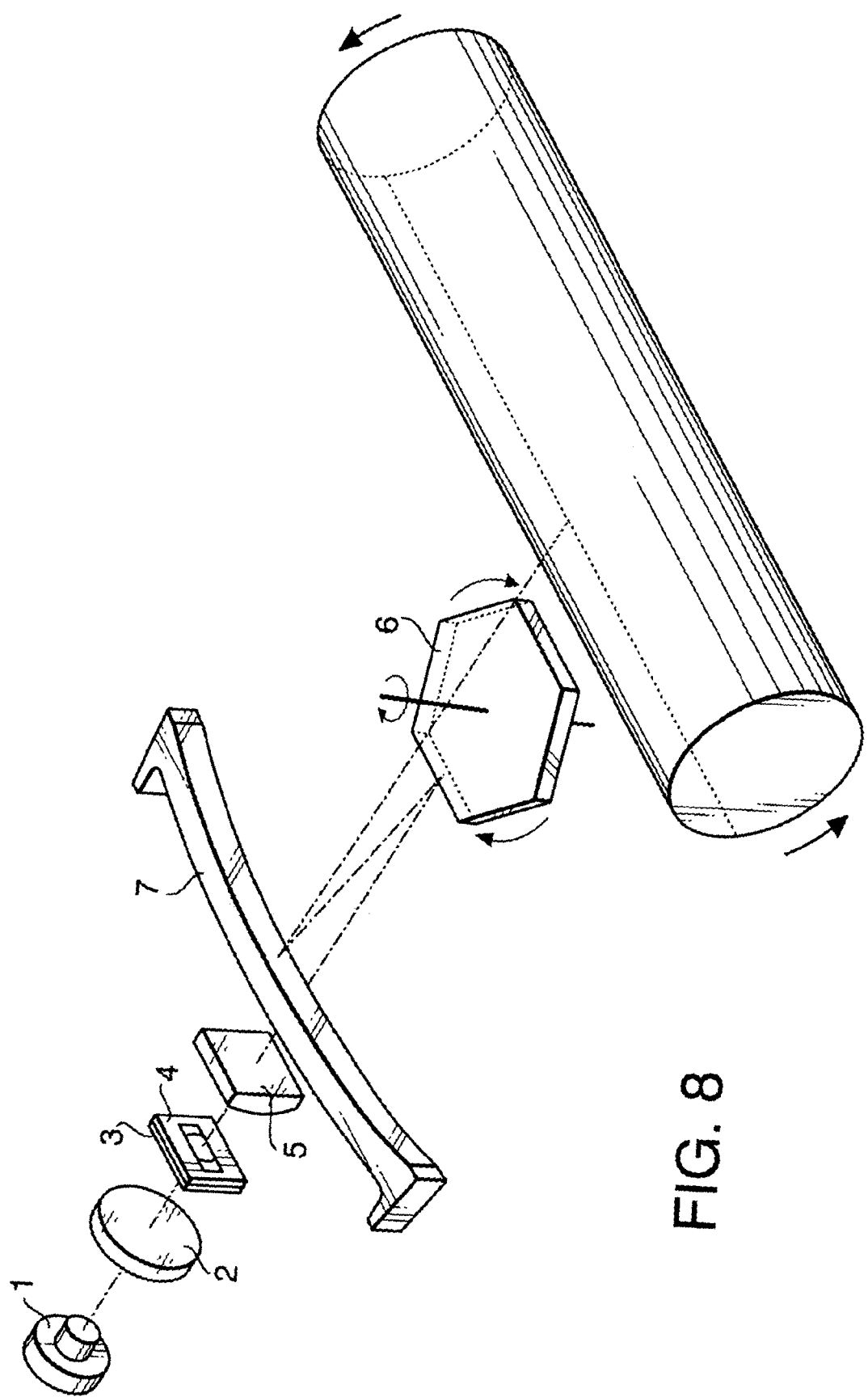
FIG. 8 is a schematic block diagram of a reflective scanning optical system to which the present invention is applied.

Further, while the present invention was applied to a transmissive scanning optical system including the fθ lens 7 as the imaging optical system, the present invention can also be applied to a reflective scanning optical system including an fθ mirror 7' as the imaging optical system as shown in FIG. 8. In the reflective scanning optical systems, the increase of side lobe intensity caused by the microscopic undulations of an optical surface of the imaging optical system is larger than in the transmissive scanning optical systems, by which the black stripes in halftone printing occur more frequently in the reflective scanning optical systems. By applying the present invention to the reflective scanning optical systems, the side lobe intensity and the black stripes occurring in halftone printing can be reduced effectively.

Second Embodiment

Figure 9A:
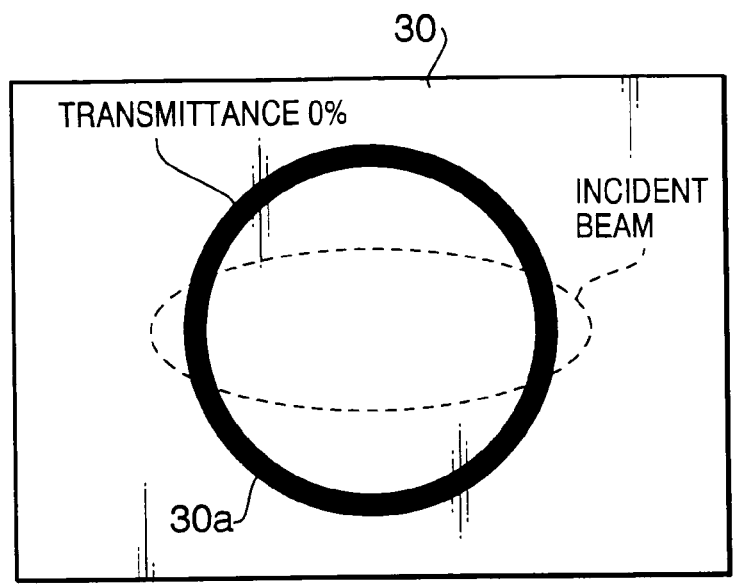
FIGS. 9A and 9B are a front view and a side view of a partial light blocking member employed in a scanning optical system in accordance with a second embodiment of the present invention.
Figure 9B:
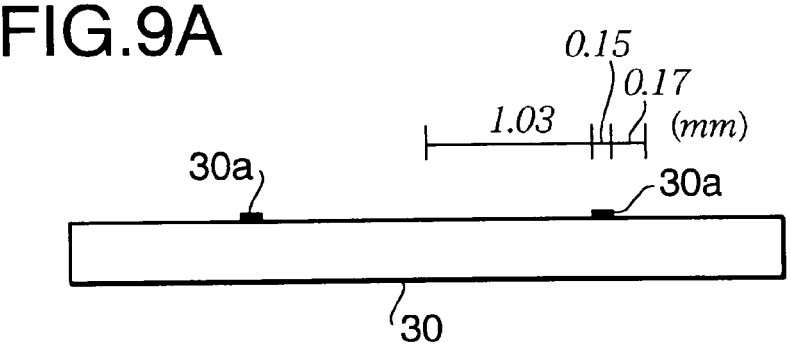

A second embodiment of the present invention has basically the same configuration as the first embodiment except for numeric values of the partial light blocking member, therefore, only the difference from the first embodiment will be explained below. FIGS. 9A and 9B are a front view and a side view of a partial light blocking member 30 employed in the second embodiment.

Also in the second embodiment, the major radius of the sectional form of the laser beam incident on the partial light blocking member 30 is set to 1.35 mm (=hmax), and the minor radius is set to 0.50 mm. As shown in FIG. 9B, since the internal diameter and external diameter of the light blocking part 30a (light blocking area) are 2.06 mm (=2×(ha1)) and 2.36 mm (=2×(ha2)), respectively, the width of the light blocking part 30a in the radial direction is only 0.15 mm. Thus, a small portion of the laser beam incident on the partial light blocking member 30 is blocked off by the light blocking part 30a while most of the incident laser beam passes through the partial light blocking member 30.

Incidentally, both abeam incident on the area inside the light blocking part 30a (central area) and a beam incident on the area outside the light blocking part 30a (light transmitting area) pass through transparent areas of the same optical thickness, therefore, the beams will have the same phase after passing through the partial light blocking member 30.

The value ((ha1+ha2)/2)/hmax equals 0.82, therefore, the partial light blocking member 30 of the second embodiment satisfies the aforementioned condition (1). Since in this embodiment S' is 0.19 and S is 2.12, the ratio S'/S is 0.09, and thus the partial light blocking member 30 also satisfies the aforementioned condition (5).

<Function of Second Embodiment>

In the following, the intensity distribution of the laser beam on the scan target surface S scanned by the scanning optical system of the second embodiment configured as above will be described comparing two cases with and without the partial light blocking member 30.

Figure 10:
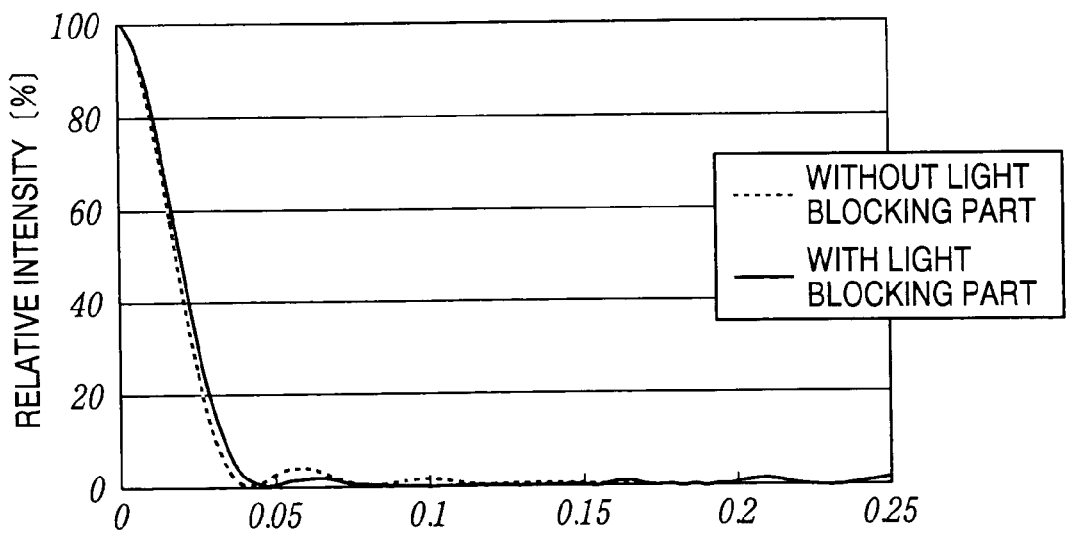
FIG. 10 is a graph showing the intensity distribution of the laser beam incident on the scan target surface with and without the partial light blocking member of FIGS. 9A and 9B.
Figure 11:
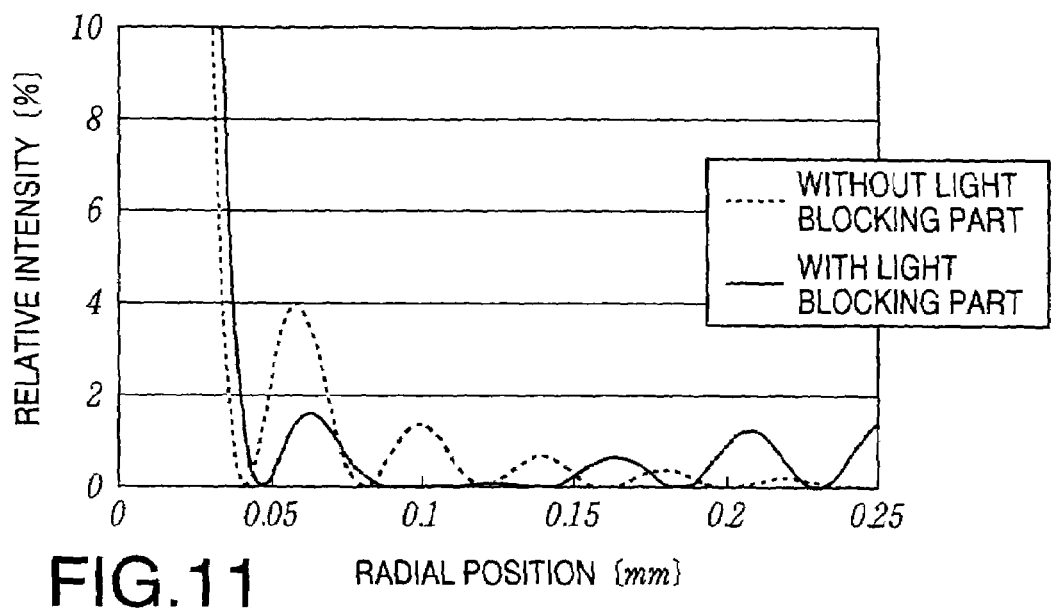
FIG. 11 is a graph magnifying part of FIG. 10.

FIG. 10 is a graph showing the intensity distribution of the laser beam incident on the scan target surface S measured in a range from the beam central axis to a point 0.25 mm away from the central axis in the main scanning direction. FIG. 11 is a graph magnifying a relative intensity range 0%–10% of the graph of FIG. 10. In FIGS. 10 and 11, broken lines indicate the intensity distribution without the partial light blocking member 30, and solid lines indicate the intensity distribution with the partial light blocking member 30.

In the case where no partial light blocking member 30 is used (broken lines in FIGS. 10 and 11), the intensity of the side lobes gets lower as the distance between the side lobe and the main beam gets longer. The intensity of the side lobe adjacent to the main beam is a little over 4%.

In contrast, in the case where the partial light blocking member 30 is used (solid lines in FIGS. 10 and 11), no side lobe intensity reaches 2%.

Therefore, even if the side lobe intensity increased by several % due to certain microscopic undulations of lens surfaces of the lenses 7a–7c of the fθ lens 7, the side lobe intensity hardly exceeds the threshold value required for the exposure of the photosensitive drum 12.

Incidentally, like the partial light blocking member 3 of FIGS. 3A and 3B, the partial light blocking member 30 of FIGS. 9A and 9B can also be formed integrally with the aperture stop 4. The partial light blocking member 30 is also applicable to reflective scanning optical systems like the one shown in FIG. 8.

Third Embodiment

Figure 12A:
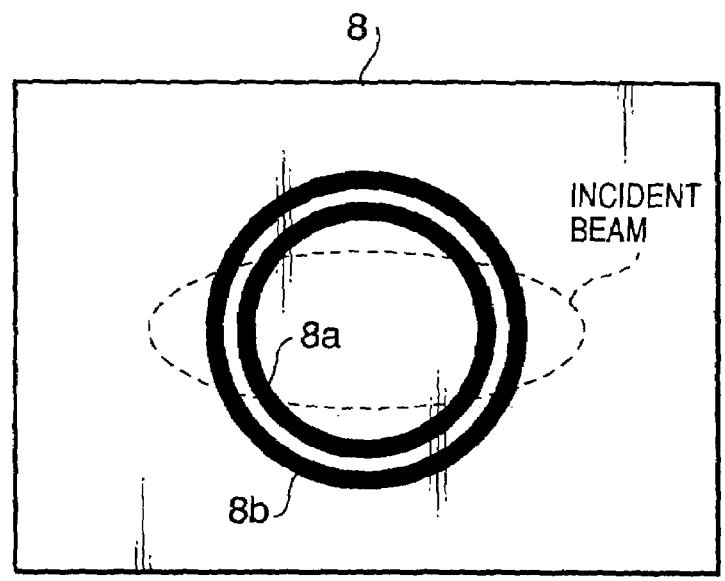
FIGS. 12A and 12B are a front view and a side view of a partial light blocking member employed in a scanning optical system in accordance with a third embodiment of the present invention.
Figure 12B:
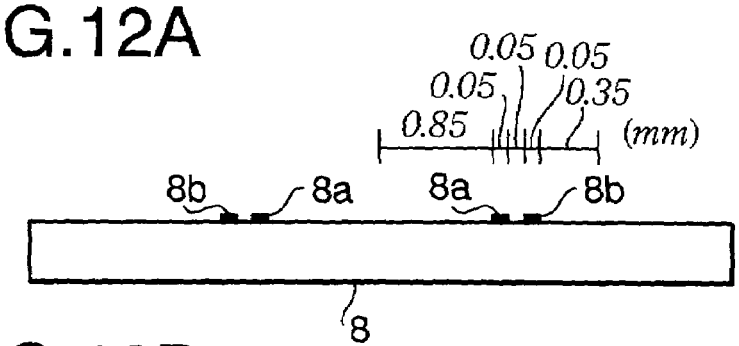

A third embodiment of the present invention has basically the same configuration as the first embodiment except that the partial light blocking member includes two light blocking parts, therefore, only the difference from the first embodiment will be explained below. FIGS. 12A and 12B respectively show a front view and a side view of a partial light blocking member 8 employed in the third embodiment.

The partial light blocking member 8 of the third embodiment is also a rectangular plate-like optical element which is placed perpendicularly to the beam central axis. As shown in FIG. 12A, the partial light blocking member 8 includes: a transparent plate; a first annular light blocking film (transmittance: 0) attached to the transparent plate as a first light blocking part 8a (light blocking area); and a second annular light blocking film (transmittance: 0) attached to the transparent plate as a second light blocking part 8b (light blocking area).

The internal diameter of the second light blocking part 8b is larger than the external diameter of the first light blocking part 8a. The first and second light blocking parts 8a and 8b are provided around the center of the transparent plate.

The partial light blocking member 8 is placed orthogonal to the central axis of the laser beam and its position is adjusted so that part of the laser beam in the vicinity of the beam central axis will be incident on an area inside the first light blocking part 8a.

As mentioned before, the sectional form of the laser beam to be incident on the partial light blocking member 8 is shaped by the collimator lens 2 into an ellipse (see a broken line in FIG. 12A), and the ellipse has the major axis in the main scanning direction and the minor axis in the auxiliary scanning direction.

In the third embodiment, the major radius of the sectional form of the laser beam incident on the partial light blocking member 8 is set to 1.35 mm (=hmax), and the minor radius is set to 0.50 mm. As shown in FIG. 12B, the internal diameter and external diameter of the first light blocking part 8a are 1.70 mm (=2×(hc1)) and 1.80 mm (=2×(hc2)), respectively and those of the second light blocking part 8b are 1.90 mm (=2×(hb1)) and 2.00 mm (=2×(hb2)), respectively. Therefore, the width of each light blocking part (8a, 8b) in the radial direction is only 0.05 mm. Thus, a small portion of the laser beam incident on the partial light blocking member 8 is blocked off by the light blocking parts 8a and 8b while most of the incident laser beam passes through the partial light blocking member 8.

Incidentally, a beam incident on the area inside the first light blocking part 8a (central area), a beam incident on the area between the first and second light blocking parts 8a and 8b (light transmitting area), and a beam incident on the area outside the second light blocking part 8b (light transmitting area) all pass through transparent areas of the same optical thickness, therefore, the beams will have the same phase after passing through the partial light blocking member 8.

Since ((hb1+hb2)/2)/hmax=0.72, ((hc1+hc2)/2)/hmax=0.65 and Sa/(Sa+Sb)=0.53(Sa=0.09, Sb=0.08), the partial light blocking member 8 of the third embodiment satisfies the aforementioned condition (4) (not satisfying the conditions (2) and (3)).

$$0.20 < Sa/(Sa+Sb) < 0.75 \quad (4)$$

Since S' is 0.17 and S is 2.12, the ratio S'/S is 0.08, and thus the partial light blocking member 8 also satisfies the aforementioned condition (5).

<Function of Third Embodiment>

In the following, the intensity distribution of the laser beam on the scan target surface S scanned by the scanning optical system of the third embodiment configured as above will be described comparing two cases with and without the partial light blocking member 8.

Figure 13:
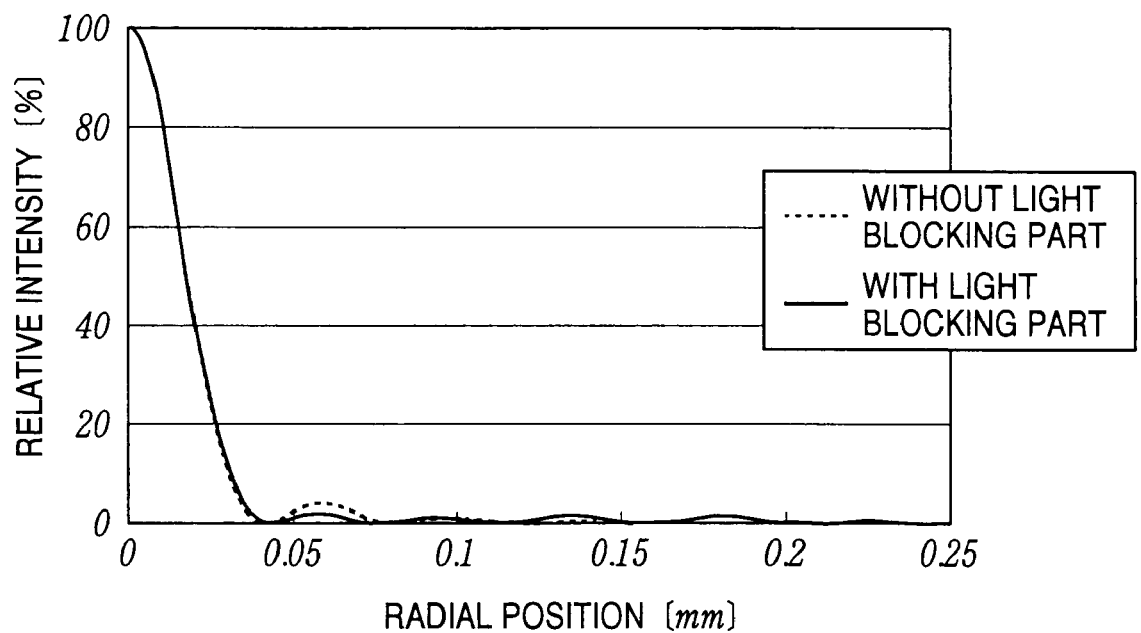
FIG. 13 is a graph showing the intensity distribution of the laser beam incident on the scan target surface with and without the partial light blocking member of FIGS. 12A and 12B.
Figure 14:
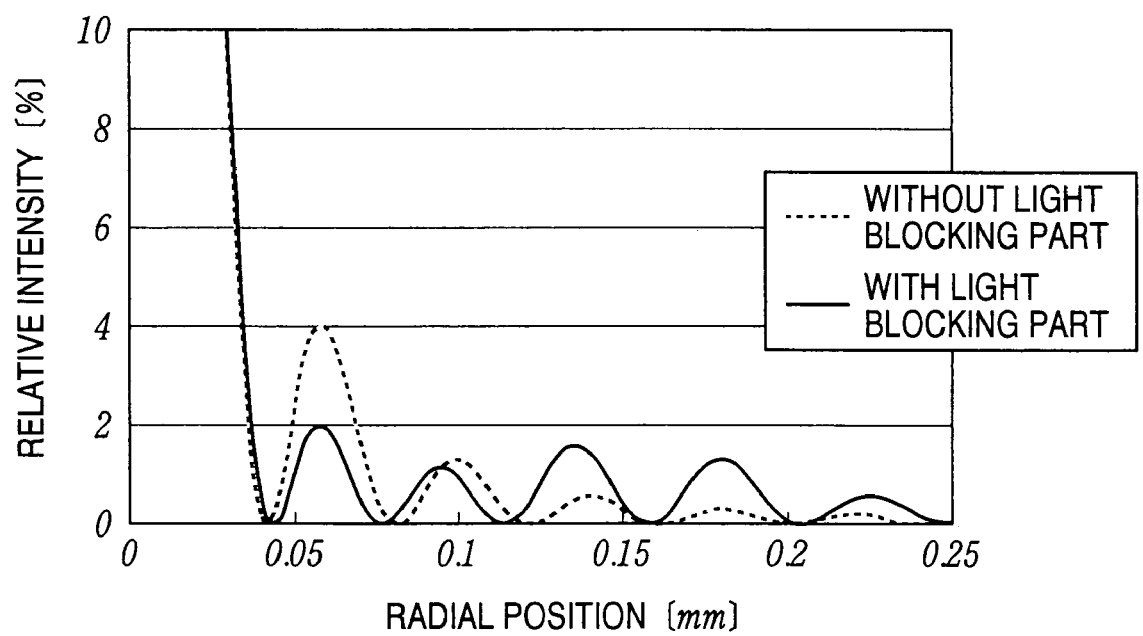
FIG. 14 is a graph magnifying part of FIG. 13.

FIG. 13 is a graph showing the intensity distribution of the laser beam incident on the scan target surface S measured in a range from the beam central axis to a point 0.25 mm away from the central axis in the main scanning direction. FIG. 14 is a graph magnifying a relative intensity range 0%–10% of the graph of FIG. 13. In FIGS. 13 and 14, broken lines indicate the intensity distribution without the partial light blocking member 8, and solid lines indicate the intensity distribution with the partial light blocking member 8.

In the case where no partial light blocking member 8 is used (broken lines in FIGS. 13 and 14), the intensity of the side lobes gets lower as the distance between the side lobe and the main beam gets longer. The intensity of the side lobe adjacent to the main beam is a little over 4%.

In contrast, in the case where the partial light blocking member 8 is used (solid lines in FIGS. 13 and 14), the change in the side lobe intensity depending on the distance from the main beam is considerably small, with no side lobe exceeding 2%.

Therefore, even if the side lobe intensity increased by several % due to certain microscopic undulations of lens surfaces of the lenses $7a$–$7c$ of the fθ lens 7, the side lobe intensity hardly exceeds the threshold value required for the exposure of the photosensitive drum 12.

Incidentally, like the partial light blocking member 3 of FIGS. 3A and 3B, the partial light blocking member 8 of FIGS. 12A and 12B can also be formed integrally with the aperture stop 4. The partial light blocking member 8 is also applicable to reflective scanning optical systems like the one shown in FIG. 8.

Fourth Embodiment

Figure 15A:
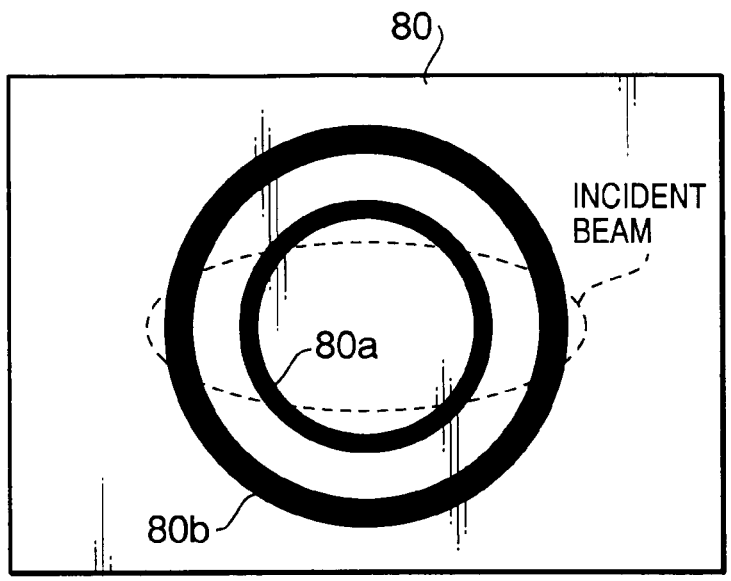
FIGS. 15A and 15B are a front view and a side view of a partial light blocking member employed in a scanning optical system in accordance with a fourth embodiment of the present invention.
Figure 15B:
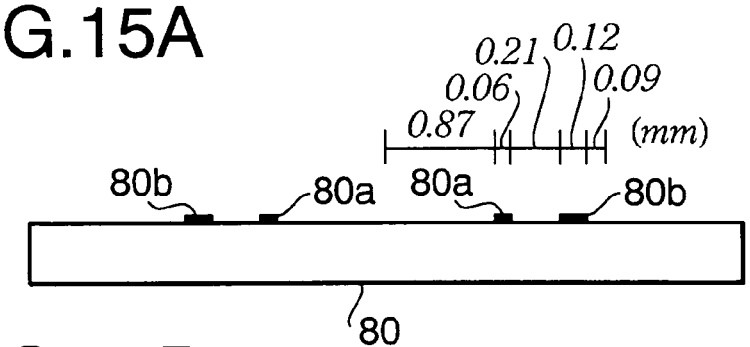

A fourth embodiment of the present invention has basically the same configuration as the third embodiment except for numeric values of the partial light blocking member, therefore, only the difference from the third embodiment will be explained below. FIGS. 15A and 15B respectively show a front view and a side view of a partial light blocking member 80 employed in the fourth embodiment.

Also in the fourth embodiment, the major radius of the sectional form of the laser beam incident on the partial light blocking member 80 is set to 1.35 mm (=hmax), and the minor radius is set to 0.50 mm. As shown in FIG. 15B, the internal diameter and external diameter of the first light blocking part 80$a$ (light blocking area) are 1.74 mm (=2×(hc1)) and 1.86 mm (=2×(hc2)), respectively, and those of the second light blocking part 80$b$ (light blocking area) are 2.28 mm (=2×(hb1)) and 2.52 mm (=2×(hb2)), respectively. Therefore, the widths of the first and second light blocking parts 80$a$ and 80$b$ in the radial direction are only 0.06 mm and 0.12 mm, respectively.

Thus, a small portion of the laser beam incident on the partial light blocking member 80 is blocked off by the light blocking parts 80$a$ and 80$b$ while most of the incident laser beam passes through the partial light blocking member 80.

Incidentally, a beam incident on the area inside the first light blocking part 80$a$ (central area), a beam incident on the area between the first and second light blocking parts 80$a$ and 80$b$ (light transmitting area), and a beam incident on the area outside the second light blocking part 80$b$ (light transmitting area) all pass through transparent areas of the same optical thickness, therefore, the beams will have the same phase after passing through the partial light blocking member 80.

Since ((hb1+hb2)/2)/hmax=0.89, ((hc1+hc2)/2)/hmax=0.67 and Sa/(Sa+Sb)=0.45 (Sa=0.10, Sb=0.12), the partial light blocking member 80 of the fourth embodiment satisfies the aforementioned conditions (2), (3) and (4).

$$0.85 < ((hb1+hb2)/2)/hmax < 0.95 \quad (2)$$

$$0.65 < ((hc1+hc2)/2)/hmax < 0.75 \quad (3)$$

Since S' is 0.22 and S is 2.12, the ratio S'/S is 0.10, and thus the partial light blocking member 80 also satisfies the aforementioned condition (5).

<Function of Fourth Embodiment>

In the following, the intensity distribution of the laser beam on the scan target surface S scanned by the scanning optical system of the fourth embodiment configured as above will be described comparing two cases with and without the partial light blocking member 80.

Figure 16:
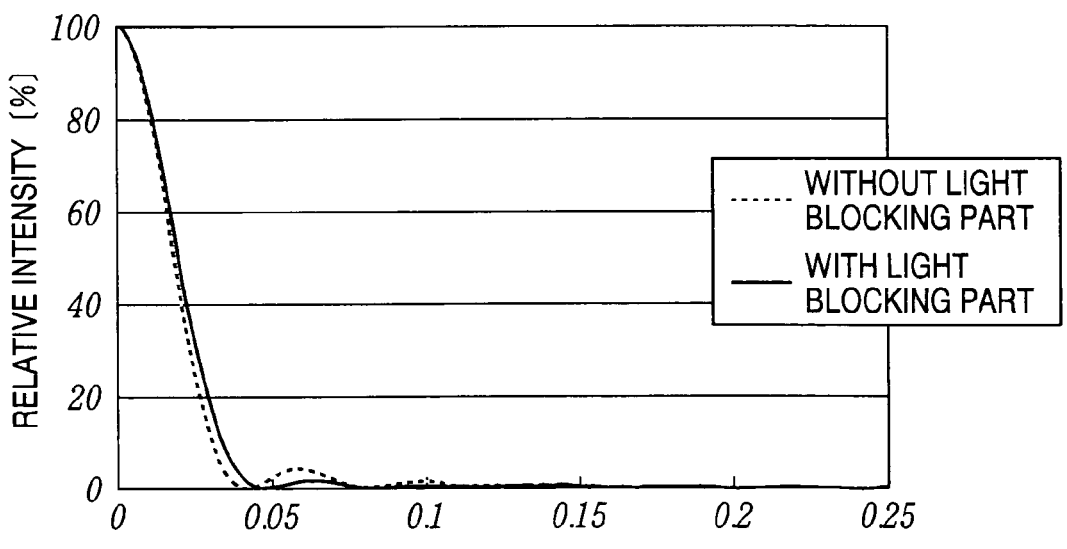
FIG. 16 is a graph showing the intensity distribution of the laser beam incident on the scan target surface with and without the partial light blocking member of FIGS. 15A and 15B.
Figure 17:
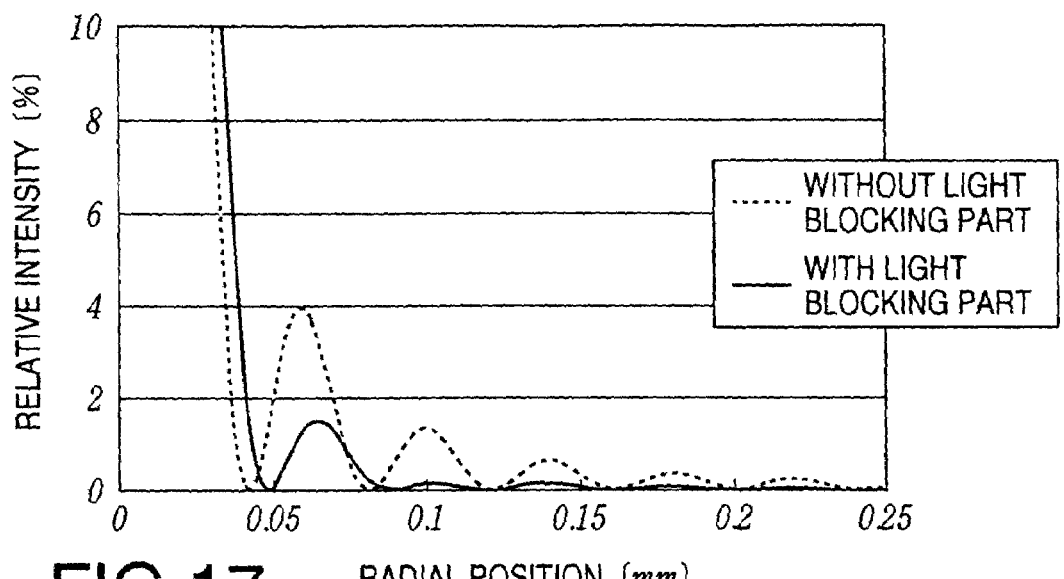
FIG. 17 is a graph magnifying part of FIG. 16.

FIG. 16 is a graph showing the intensity distribution of the laser beam incident on the scan target surface S measured in a range from the beam central axis to a point 0.25 mm away from the central axis in the main scanning direction. FIG. 17 is a graph magnifying a relative intensity range 0%–10% of the graph of FIG. 16. In FIGS. 16 and 17, broken lines indicate the intensity distribution without the partial light blocking member 80, and solid lines indicate the intensity distribution with the partial light blocking member 80.

In the case where no partial light blocking member 80 is used (broken lines in FIGS. 16 and 17), the intensity of the side lobes gets lower as the distance between the side lobe and the main beam gets longer. The intensity of the side lobe adjacent to the main beam is a little over 4%.

In contrast, in the case where the partial light blocking member 80 is used (solid lines in FIGS. 16 and 17), no side lobe intensity reaches 2%. Further, since the conditions (2) and (3) are satisfied, the side lobe intensity is still lower than that of the third embodiment.

Therefore, even if the side lobe intensity is increased by several % due to certain microscopic undulations of lens surfaces of the lenses $7a$–$7c$ of the fθ lens 7, the side lobe intensity hardly exceeds the threshold value required for the exposure of the photosensitive drum 12.

Like the partial light blocking member 3 of FIGS. 3A and 3B, the partial light blocking member 80 of FIGS. 15A and 15B can also be formed integrally with the aperture stop 4. The partial light blocking member 80 is also applicable to reflective scanning optical systems like the one shown in FIG. 8.

Fifth Embodiment

Figure 18A:
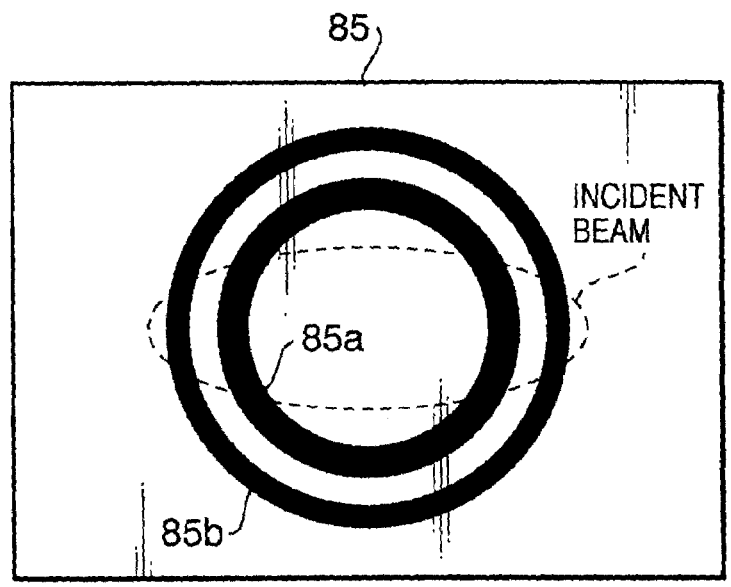
FIGS. 18A and 18B are a front view and a side view of a partial light blocking member employed in a scanning optical system in accordance with a fifth embodiment of the present invention.
Figure 18B:
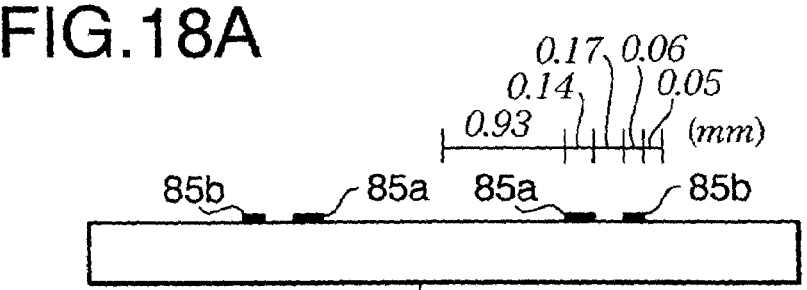

A fifth embodiment of the present invention also has basically the same configuration as the third embodiment except for numeric values of the partial light blocking member, therefore, only the difference from the third embodiment will be explained below. FIGS. 18A and 18B respectively show a front view and a side view of a partial light blocking member 85 employed in the fifth embodiment.

Also in the fifth embodiment, the major radius of the sectional form of the laser beam incident on the partial light blocking member 85 is set to 1.35 mm (=hmax), and the minor radius is set to 0.50 mm. As shown in FIG. 18B, the internal diameter and external diameter of the first light blocking part 85$a$ (light blocking area) are 1.86 mm (=2×(hc1)) and 2.14 mm (=2×(hc2)), respectively, and those of the second light blocking part 85$b$ (light blocking area) are 2.48 mm (=2×(hb1)) and 2.60 mm (=2×(hb2)), respectively. Therefore, the widths of the first and second light blocking parts 85$a$ and 85$b$ in the radial direction are only 0.14 mm and 0.06 mm, respectively.

Thus, a small portion of the laser beam incident on the partial light blocking member 85 is blocked off by the light blocking parts 85$a$ and 85$b$ while most of the incident laser beam passes through the partial light blocking member 85.

Incidentally, a beam incident on the area inside the first light blocking part 85$a$ (central area), a beam incident on the area between the first and second light blocking parts 85$a$ and 85$b$ (light transmitting area), and a beam incident on the area outside the second light blocking part 85$b$ (light transmitting area) all pass through transparent areas of the same optical thickness, therefore, the beams will have the same phase after passing through the partial light blocking member 85.

Since $((hb1+hb2)/2)/hmax=0.94$, $((hc1+hc2)/2)/hmax=0.74$ and $Sa/(Sa+Sb)=0.84$ ($Sa=0.21$, $Sb=0.04$), the partial light blocking member 85 of the fifth embodiment satisfies the aforementioned conditions (2), (3) and (4). The ratio $S'/S$ is 0.12 ($S'=0.25$, $S=2.12$), and thus the partial light blocking member 85 also satisfies the aforementioned condition (5).

<Function of Fifth Embodiment>

In the following, the intensity distribution of the laser beam on the scan target surface S scanned by the scanning optical system of the fifth embodiment configured as above will be described comparing two cases with and without the partial light blocking member 85.

Figure 19:
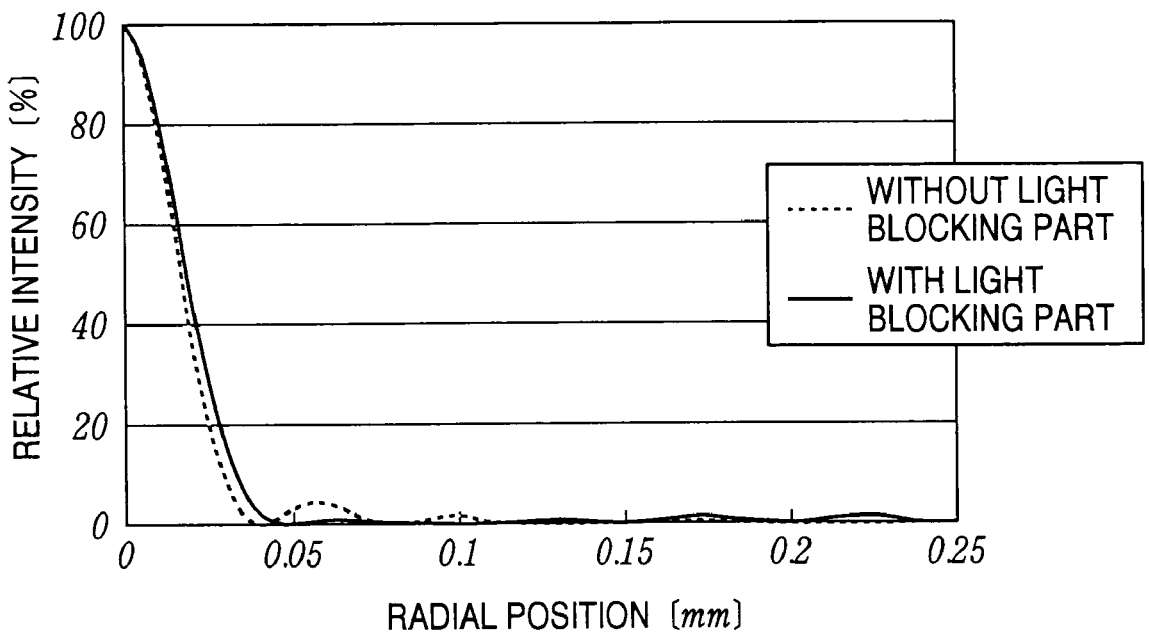
FIG. 19 is a graph showing the intensity distribution of the laser beam incident on the scan target surface with and without the partial light blocking member of FIGS. 18A and 18B.
Figure 20:
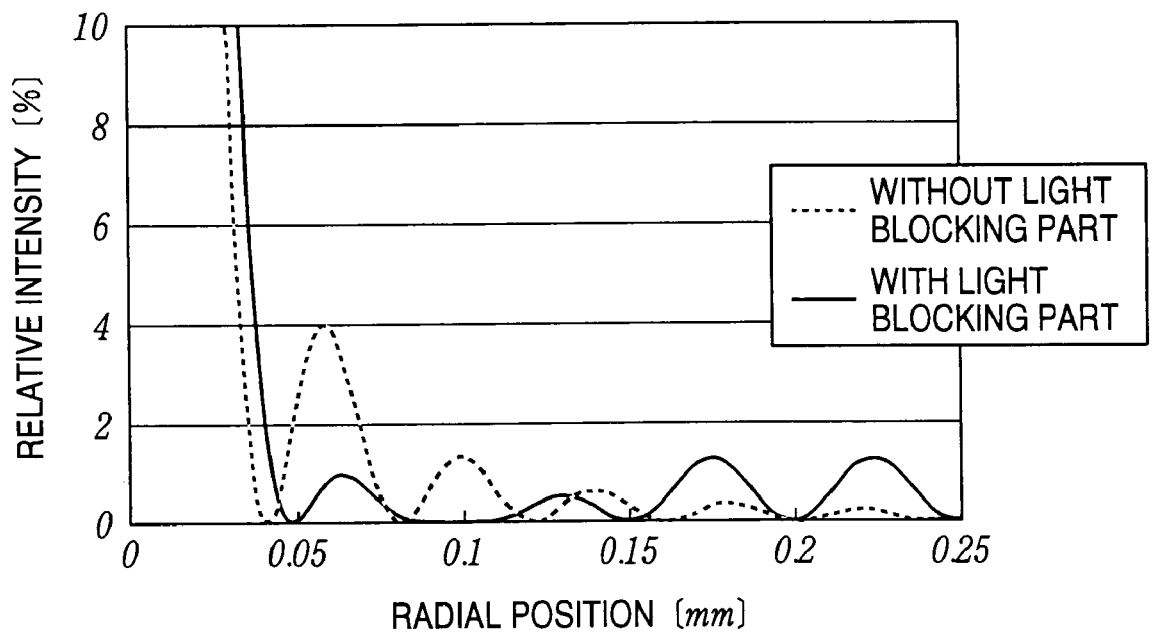
FIG. 20 is a graph magnifying part of FIG. 19.

FIG. 19 is a graph showing the intensity distribution of the laser beam incident on the scan target surface S measured in a range from the beam central axis to a point 0.25 mm away from the central axis in the main scanning direction. FIG. 20 is a graph magnifying a relative intensity range 0%–10% of the graph of FIG. 19. In FIGS. 19 and 20, broken lines indicate the intensity distribution without the partial light blocking member 85, and solid lines indicate the intensity distribution with the partial light blocking member 85.

In the case where no partial light blocking member 85 is used (broken lines in FIGS. 19 and 20), the intensity of the side lobes gets lower as the distance between the side lobe and the main beam gets longer. The intensity of the side lobe adjacent to the main beam is a little over 4%.

In contrast, in the case where the partial light blocking member 85 is used (solid lines in FIGS. 19 and 20), no side lobe intensity reaches 2%. Further, since the conditions (2) and (3) are satisfied, the side lobe intensity is still lower than that of the third embodiment.

Therefore, even if the side lobe intensity is increased by several % due to certain microscopic undulations of lens surfaces of the lenses 7a–7c of the fθ lens 7, the side lobe intensity hardly exceeds the threshold value required for the exposure of the photosensitive drum 12.

The partial light blocking member 85 of FIGS. 18A and 18B can also be formed integrally with the aperture stop 4 like the partial light blocking member 3 of FIGS. 3A and 3B. The partial light blocking member 85 is also applicable to reflective scanning optical systems like the one shown in FIG. 8.

Sixth Embodiment

Figure 21A:
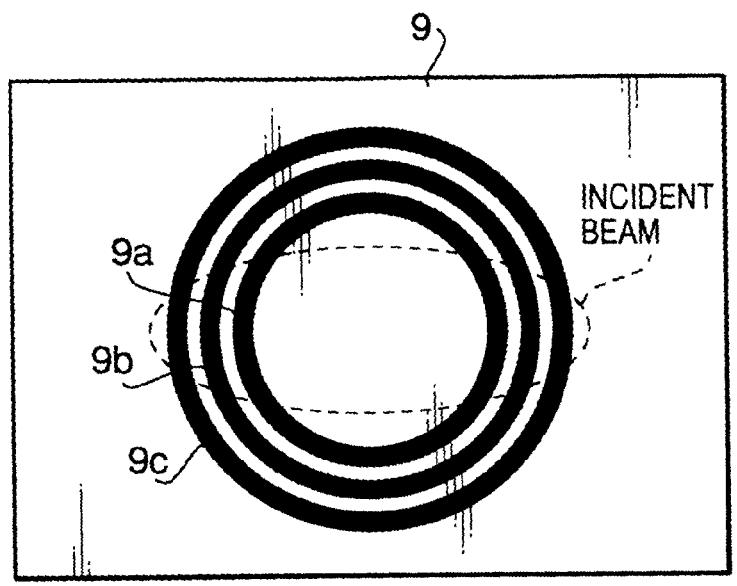
FIGS. 21A and 21B are a front view and a side view of a partial light blocking member employed in a scanning optical system in accordance with a sixth embodiment of the present invention.
Figure 21B:
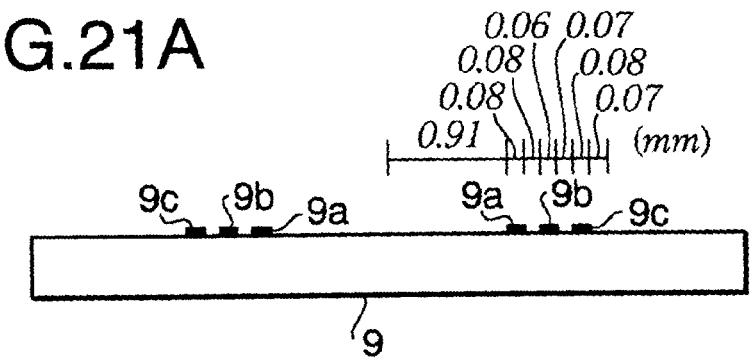

A sixth embodiment of the present invention has basically the same configuration as the first embodiment except that the partial light blocking member includes three light blocking parts, therefore, only the difference from the first embodiment will be explained below. FIGS. 21A and 21B respectively show a front view and a side view of a partial light blocking member 9 employed in the sixth embodiment.

The partial light blocking member 9 of the sixth embodiment is also a rectangular plate-like optical element which is placed perpendicularly to the beam central axis. As shown in FIG. 21A, the partial light blocking member 9 includes: a transparent plate; a first annular light blocking film (transmittance: 0) attached to the transparent plate as a first light blocking part 9a (light blocking area); a second annular light blocking film (transmittance: 0) attached to the transparent plate as a second light blocking part 9b (light blocking area); and a third annular light blocking film (transmittance: 0) attached to the transparent plate as a third light blocking part 9c (light blocking area).

The internal diameter of the second light blocking part 9b is larger than the external diameter of the first light blocking part 9a, and the internal diameter of the third light blocking part 9c is larger than the external diameter of the second light blocking part 9b. The first, second and third light blocking parts 9a, 9b and 9c are provided around the center of the transparent plate.

The partial light blocking member 9 is placed perpendicularly to the central axis of the laser beam and its position is adjusted so that part of the laser beam in the vicinity of the beam central axis will be incident on an area inside the first light blocking part 9a.

As mentioned before, the sectional form of the laser beam to be incident on the partial light blocking member 9 is shaped by the collimator lens 2 into an ellipse (see a broken line in FIG. 21A), and the ellipse has the major axis in the main scanning direction and the minor axis in the auxiliary scanning direction.

In the sixth embodiment, the major radius of the sectional form of the laser beam incident on the partial light blocking member 9 is set to 1.35 mm (=hmax), and the minor radius is set to 0.50 mm.

As shown in FIG. 21B, the internal diameter and external diameter of the first light blocking part 9a are 1.82 mm ($=2\times(hc1)$) and 1.98 mm ($=2\times(hc2)$), respectively, those of the second light blocking part 9b are 2.14 mm and 2.26 mm, respectively, and those of the third light blocking part 9c are 2.40 mm ($=2\times(hb1)$) and 2.56 mm ($=2\times(hb2)$), respectively. Therefore, the widths of the first, second and third light blocking parts 9a, 9b and 9c in the radial direction are only 0.08 mm, 0.06 mm and 0.08 mm, respectively.

Thus, a small portion of the laser beam incident on the partial light blocking member 9 is blocked off by the light blocking parts 9a, 9b and 9c while most of the incident laser beam passes through the partial light blocking member 9.

Incidentally, a beam incident on the area inside the first light blocking part 9a (central area), a beam incident on the area between the first and second light blocking parts 9a and 9b (light transmitting area), a beam incident on the area between the second and third light blocking parts 9b and 9c (light transmitting area), and a beam incident on the area outside the third light blocking part 9c (light transmitting area) all pass through transparent areas of the same optical thickness, therefore, the beams will have the same phase after passing through the partial light blocking member 9.

Since $((hb1+hb2)/2)/hmax=0.92$, $((hc1+hc2)/2)/hmax=0.70$ and $Sa/(Sa+Sb)=0.65$ ($Sa=0.13$, $Sb=0.07$), the partial light blocking member 9 of the sixth embodiment satisfies the aforementioned conditions (2), (3) and (4). The ratio $S'/S$ is 0.13 ($S'=0.28$, $S=2.12$), and thus the partial light blocking member 9 also satisfies the aforementioned condition (5).

<Function of Sixth Embodiment>

In the following, the intensity distribution of the laser beam on the scan target surface S scanned by the scanning optical system of the sixth embodiment configured as above will be described comparing two cases with and without the partial light blocking member 9.

Figure 22:
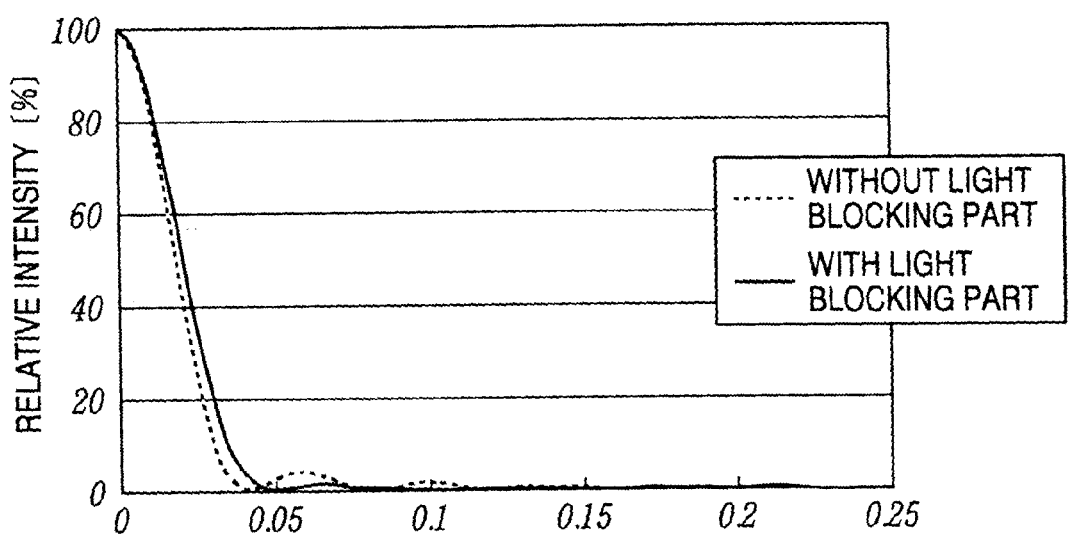
FIG. 22 is a graph showing the intensity distribution of the laser beam incident on the scan target surface with and without the partial light blocking member of FIGS. 21A and 21B.
Figure 23:
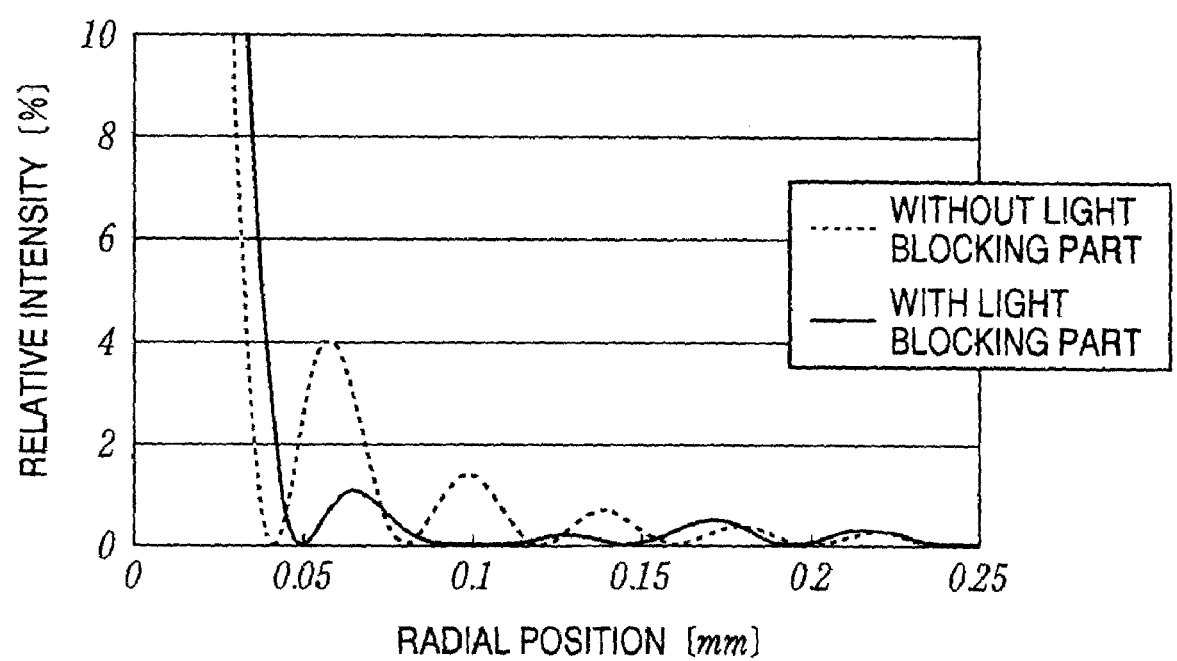
FIG. 23 is a graph magnifying part of FIG. 22.

FIG. 22 is a graph showing the intensity distribution of the laser beam incident on the scan target surface S measured in a range from the beam central axis to a point 0.25 mm away from the central axis in the main scanning direction. FIG. 23 is a graph magnifying a relative intensity range 0%–10% of the graph of FIG. 22. In FIGS. 22 and 23, broken lines indicate the intensity distribution without the partial light blocking member 9, and solid lines indicate the intensity distribution with the partial light blocking member 9.

In the case where no partial light blocking member 9 is used (broken lines in FIGS. 22 and 23), the intensity of the side lobes gets lower as the distance between the side lobe and the main beam gets longer. The intensity of the side lobe adjacent to the main beam is a little over 4%.

In contrast, in the case where the partial light blocking member 9 is used (solid lines in FIGS. 22 and 23), no side lobe intensity reaches 1%. Further, since the number of light blocking parts is increased to three from the fifth embodiment and the sizes and positions of the light blocking parts 9a–9c are set properly, the side lobe intensity is still lower than that of the fifth embodiment.

Therefore, even if the side lobe intensity increased by several % due to certain microscopic undulations of lens surfaces of the lenses 7a–7c of the fθ lens 7, the side lobe intensity hardly exceeds the threshold value required for the exposure of the photosensitive drum 12.

The partial light blocking member 9 of FIGS. 21A and 21B can also be formed integrally with the aperture stop 4 like the partial light blocking member 3 of FIGS. 3A and 3B. The partial light blocking member 9 is also applicable to reflective scanning optical systems like the one shown in FIG. 8.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

As described above, the partial light blocking member may include either a pair of light blocking/transmitting areas or two or more pairs of light blocking/transmitting areas. In the former case where the optical element includes a light blocking area and a light transmitting area, the light blocking area may be placed outside the central area while placing the light transmitting area outside the light blocking area. In the latter case where the optical element includes N (>1) light blocking areas and N light transmitting areas, the light blocking areas and the light transmitting areas may be arranged alternately outward from the central area. In this case, it is preferable that the areas alternately arranged outward should be ended by a light transmitting area.

In either case with a pair of light blocking/transmitting areas or two or more pairs of light blocking/transmitting areas, the light blocking area(s) and the light transmitting area(s) may either be arranged radially or arranged in the main scanning direction. In the latter case where the light blocking area(s) and the light transmitting area(s) are arranged in the main scanning direction, preferably, the areas are placed on both sides of the central area. In the case where the light blocking/transmitting areas are arranged in the main scanning direction on both sides of the central area, the light blocking areas (or the light transmitting areas) on both sides of the central area form part of an area having an annular or polygonal (quadrangular, hexagonal, etc.) shape.

In the scanning optical system and the printer in accordance with the present invention, the imaging optical system may be constructed either as a transmissive optical system employing an fθ lens, etc. or a reflective optical system employing an fθ mirror, etc. The deflecting system employed in the scanning optical system can be implemented by either a rotating polygon mirror or a galvanometer mirror.

As explained above, in the scanning optical system and the printer in accordance with the present invention, the possibility of high side lobe intensity exceeding the threshold value can be reduced even when optical surfaces of the imaging optical system have certain microscopic undulations, by which the black stripes occurring in halftone printing can be prevented and print quality can be improved. Further, the permissible range of microscopic undulations on the optical surfaces is widened thanks to the decrease of the side lobe intensity, by which manufacturing costs of the scanning optical systems and printers can be reduced.

The present disclosure relates to the subject matters contained in Japanese Patent Applications No. P2002-271883 filed on Sep. 18, 2002, and NO. P2002-346400 filed on Nov. 28, 2002, which are expressly incorporated herein by reference in their entireties.

What is claimed is:

1. A scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on said scan target surface, the scanning optical system comprising:
   an optical element positioned on an optical path between said light source and said deflecting system,
   said optical element including:
   a central area configured to transmit part of the laser beam at the central axis of the laser beam;
   at least one light blocking area configured to block part of the laser beam incident on part of said optical element outside said central area; and
   at least one light transmitting area configured to transmit part of the laser beam incident on part of said optical element other than said central area and said light blocking area.

2. The scanning optical system according to claim 1, wherein said central area and said at least one light transmitting area give the same phase to beams passing therethrough.

3. The scanning optical system according to claim 1, wherein said optical element includes a pair of said light blocking/transmitting areas.

4. The scanning optical system according to claim 3,
   wherein each of said light blocking areas is positioned outside and adjacent said central area,
   wherein each of said light transmitting areas is positioned outside and adjacent said at least one light blocking area.

5. The scanning optical system according to claim 4, wherein each of said at least one light blocking area and said at least one light transmitting area is positioned on both sides of said central area in regard to the main scanning direction.

6. The scanning optical system according to claim 5, wherein each of said at least one light blocking area and said at least one light transmitting area is symmetrically positioned with respect to said central area in regard to the main scanning direction.

7. The scanning optical system according to claim 3, wherein a cross section of the laser beam incident on said optical element taken along a plane perpendicular to the central axis has an elliptical form.

8. The scanning optical system according to claim 7, wherein the elliptical cross section of the laser beam has its major axis in the main scanning direction.

9. The scanning optical system according to claim 3, wherein a distance "ha1" between the central axis of the laser beam incident on said optical element and an inner edge of said light blocking area measured in the main scanning direction, a distance "ha2" between the central axis of the laser beam and an outer edge of said light blocking area measured in the main scanning direction, and a radius "hmax" of a cross section of the laser beam incident on said optical element measured in the main scanning direction satisfy a relationship:

$$0.70 < ((ha1+ha2)/2)/hmax < 0.85.$$

10. The scanning optical system according to claim 1, wherein said optical element includes two or more pairs of said light blocking/transmitting areas.

11. The scanning optical system according to claim 10, wherein said light blocking areas and said light transmitting areas are arranged alternately outward from said central area.

12. The scanning optical system according to claim 11, wherein said light blocking areas and said light transmitting areas are arranged alternately in regard to the main scanning direction.

13. The scanning optical system according to claim 12, wherein each of said light blocking areas is symmetrically positioned with respect to said central area in regard to the main scanning direction.

14. The scanning optical system according to claim 12, wherein each of said light transmitting areas is symmetrically positioned with respect to said central area in regard to the main scanning direction.

15. The scanning optical system according to claim 10, wherein a cross section of the laser beam incident on said optical element taken along a plane perpendicular to the central axis has an elliptical form.

16. The scanning optical system according to claim 15, wherein the elliptical cross section of the laser beam has its major axis in the main scanning direction.

17. The scanning optical system according to claim 14, wherein a distance "hb1" between the central axis of the laser beam incident on the optical element and an inner edge of an outermost one of said light blocking areas measured in the main scanning direction, a distance "hb2" between the central axis of the laser beam and an outer edge of the outermost light blocking area measured in the main scanning direction, and a radius "hmax" of a cross section of the laser beam incident on said optical element measured in the main scanning direction satisfy a relationship:

$$0.85 < ((hb1+hb2)/2)/hmax < 0.95.$$

18. The scanning optical system according to claim 17, wherein a distance "hc1" between the central axis of the laser beam incident on the optical element and an inner edge of an innermost one of said light blocking areas measured in the main scanning direction, a distance "hc2" between the central axis of the laser beam and an outer edge of the innermost light blocking area measured in the main scanning direction, and the radius "hmax" of the cross section of the laser beam measured in the main scanning direction satisfy a relationship:

$$0.65 < ((hc1+hc2)/2)/hmax < 0.75.$$

19. The scanning optical system according to claim 17, wherein said scanning optical system satisfies a relationship:

$$0.20 < Sa/(Sa+Sb) < 0.75$$

where Sa represents a size of a portion of the innermost one of said light blocking areas, the laser beam being incident on the innermost one of said light blocking areas within the portion of the innermost one, and Sb represents a size of a portion of the outermost one of said light blocking areas, the laser beam being incident on the outermost one of said light blocking areas within the portion of the outermost one.

20. The scanning optical system according to claim 1, wherein said scanning optical system satisfies a relationship:

$$0.03 < S'/S < 0.30$$

where S' represents a size of a portion of said at least one light blocking area, the laser beam being incident on said at least one light blocking area within the portion of said at least one light blocking area, and S represents a size of a cross section of the laser beam incident on said optical element taken along a plane perpendicular to the central axis.

21. The scanning optical system according to claim 1, wherein said imaging optical system comprises an optical system including a reflecting surface.

22. The scanning optical system according to claim 1,
wherein said optical element further includes a shading part as an aperture stop,
wherein said at least one light blocking area and said at least one light transmitting area are positioned in an aperture of said shading part.

23. A printer comprising a scanning optical system for dynamically deflecting a laser beam emitted from a light source by a deflecting system, converging the dynamically deflected laser beam by an imaging optical system into a spot beam on a scan target surface, and thereby scanning the spot beam in a main scanning direction on said scan target surface,
said scanning optical system including:
an optical element positioned on an optical path between said light source and said deflecting system,
said optical element including:
a central area configured to transmit part of the laser beam at a central axis of the laser beam;
at least one light blocking area configured to block part of the laser beam incident on part of said optical element outside said central area; and
at least one light transmitting area configured to transmit part of the laser beam incident on part of said optical element other than said central area and said at least one light blocking area.

* * * * *